No. 635,896. Patented Oct. 31, 1899.
D. H. MILLER.
VELOCIPEDE FRAME.
(Application filed Oct. 31, 1898.)
(No Model.)

Witnesses:
W. J. Jacker.
P. J. Lang.

Inventor:
David H. Miller

UNITED STATES PATENT OFFICE.

DAVID H. MILLER, OF CHICAGO, ILLINOIS, ASSIGNOR TO THE AMERICAN CHAINLESS WHEEL COMPANY, OF SAME PLACE.

VELOCIPEDE-FRAME.

SPECIFICATION forming part of Letters Patent No. 635,896, dated October 31, 1899.

Application filed October 31, 1898. Serial No. 695,111. (No model.)

*To all whom it may concern:*

Be it known that I, DAVID H. MILLER, a citizen of the United States of America, residing at Chicago, in the county of Cook and State of Illinois, have invented certain new and useful Improvements in Velocipede-Frames, of which the following is a specification.

My invention relates to certain new and useful improvements in velocipede-frames, the object of my invention being to provide a frame adapted to rest upon three wheels, which form three independent points of support, in such a manner as to allow either one of these wheels to move vertically when passing over a ridge or through a depression and also to so mount the seat that the vertical movement of any one of the wheels will not materially change the altitude of the seat, the object being to take the vertical movements of the wheels in the frame itself, and thereby relieve the rider from the jar experienced by the use of the ordinary bicycle.

To such end my invention consists in certain novel features, which will be fully described below in connection with the preferred construction, and the essential characteristics which will be pointed out in the appended claims.

Figure 1 in the drawings presented herewith is a side elevation of said preferred form of my invention, in which the front or steering wheel is lettered A, the middle or driving wheel is lettered B, the rear or caster wheel is lettered C. The front wheel is mounted in a fork Y, having a stem pivoted in the forward member D of the frame and controlled by means of a handle-bar E, as is customary in the ordinary bicycle. The rear wheel is mounted in the fork X, having a stem pivoted in the rear member F of the frame in the manner of a caster-wheel, so that said wheel is free to turn as required by the various movements of the forward wheels. The forward member D of the frame and the rear member F thereof are connected at the top by a brace G, so constructed that the vertical movement of the wheels traveling on an uneven surface will cause said brace G to increase and diminish in length and at the same time maintain a rigid resistance to pressure or weight. This brace G is pivoted to the top of the forward member D of the frame and to the rear member F by pins H H, respectively. The seat I is supported upon said brace G by a suitable fastening. Said brace G is composed of two tubes telescoped into each other, the diameter or sizes of which will vary sufficiently to admit of the introduction of small balls V, suitably provided with ways W and W², which ways extend a suitable length longitudinally of said brace G to permit of a maximum and minimum extension and contraction of the brace G. The ways W are situated, respectively, on the outer periphery of the inner tube and the ways W² on the inner periphery of the outer tube, which tubes combined form said brace G. These ways W and W², in which said balls V are placed, are directly opposite each other, so that the ways W in the inner tube will form one part of the said ways and the ways W² on the inner periphery of the outer tube will form the other part of said ways. I prefer to construct these ways separately from the tubes, then adjust them on and in their respective tubes, and then fasten them securely thereto. The object of this construction is obviously for the purpose of securing a sensitive bearing and easy action when said brace G is in the act of becoming shorter or longer by telescoping action in obedience to the demand for such action by the wheels A B C when said wheels are running on an uneven surface, as hereinbefore stated. From the rear member F of the frame extend two forked braces J K, which embrace the drive-wheel and the opposite forks of which are respectively secured to two hanger-plates L, connected by the axle N to the drive-wheel, and from the forward member D of the frame extend two braces O P, united at Z and pivoted on axle N.

Figure 1:
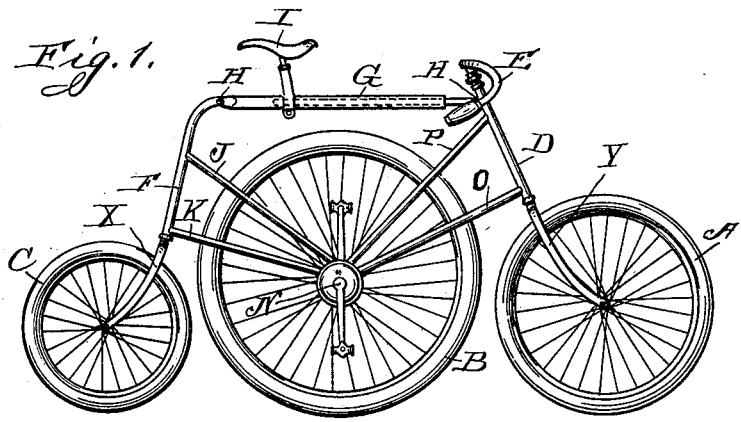
Figure 2:
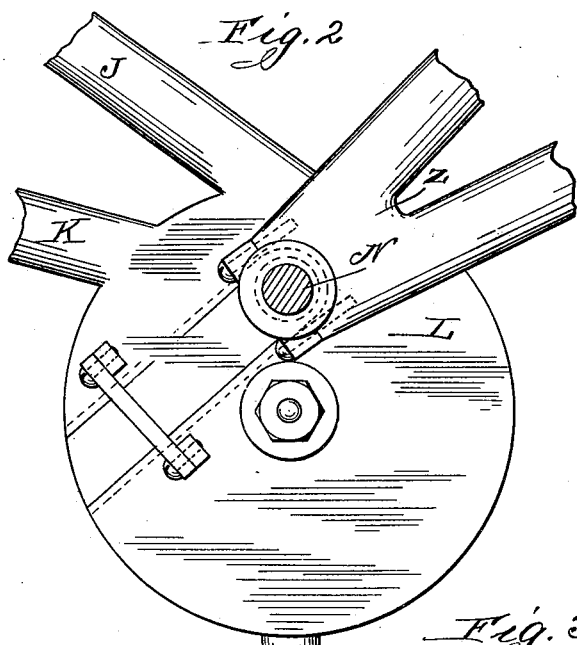
Fig. 2 is an enlarged side elevation showing plates L and forked braces J K and P O broken off near their pivoted points on the axle of the driving-wheel. This view also shows one of the crank-arms broken off.
Figure 4:
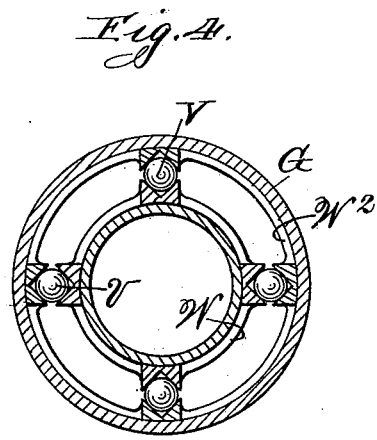
Figure 3:
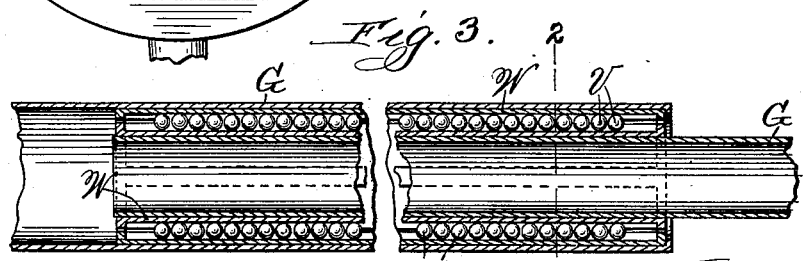
Fig. 3 is an enlarged longitudinal sectional view of brace G, showing the telescope-tubes in position, also ways W and balls V in their respective positions.

Fig. 4 is an enlarged cross-sectional view through line 2 in Fig. 2, showing the tubes G, the ways W, and balls V all in their respective positions. This construction is in effect the combination of two rigid frames—one the triangular frame formed by members D O P and resting upon the front and drive wheel and the other a similar triangular frame formed by the members F J K and resting on the rear and drive wheel B and steering-wheel A and caster-wheel C by rear frame J K F. The telescoping action of brace G, which is pivoted to forward member D and rear member F by pins H H, permits the pivoted points H H to move toward or away from each other, so that either of the wheels may rise or fall to conform to any unevenness upon the surface on which they run. Such vertical movement of the wheels, moreover, does not cause an equal vertical movement of the saddle, for the reason that when the wheels rise and fall the distance between the pivots H H increases and diminishes by the telescoping action of brace G. Thus the vertical movement of one wheel compensates for the other and reduces the vertical action of the seat to a minimum. It being possible to vary the form and construction of my device, I therefore do not limit myself to the specific details shown.

Having thus described my invention, what I claim, and desire to secure by Letters Patent, is—

1. The combination with three wheels A, B, C, of two frames pivoted respectively upon the wheels A, B, and the wheels B, C, brace G supplied with ways and balls to admit of easy telescopic action, said brace G pivoted at one end to the front member D of forward frame D, O, P, by pin H the other end of said brace G pivoted to the member F of rear frame K, J, F, also by a pivot H substantially as described.

2. The combination in a velocipede or analogous device, with a forward or steering wheel, an intermediate or drive wheel, a rear or caster wheel, a fork bracing the forward wheel, and provided with a stem and handle-bar; a frame having a forward member in which said stem is pivoted, two forward braces extending rearward therefrom embracing the driving-wheel and terminating adjacent to the center of said wheel; a fork embracing the rear wheel, having a suitable stem; a second frame having a rear member in which said stem is pivoted, two forked braces extending therefrom embracing the driving-wheel and terminating adjacent to the center thereof, a pivoted connection for the respective braces of the two frames carried upon the drive-wheel; suitable cranks and pedals, brace G provided with a seat; the forward end of brace G pivoted to forward member D; the rear end of brace G pivoted to the rear member F; brace G capable of changing in length, by telescopic action, substantially as described.

In witness whereof I have hereunto set my hand at Chicago, in the county of Cook and State of Illinois, this 27th day of October, A. D. 1898.

DAVID H. MILLER.

Witnesses:
F. J. LANG,
E. B. TRUBEY.